(12) United States Patent
Verwaest et al.

(10) Patent No.: US 9,250,874 B1
(45) Date of Patent: Feb. 2, 2016

(54) SHARING PROPERTY DESCRIPTOR INFORMATION BETWEEN OBJECT MAPS

(71) Applicant: Google Inc., Mountain View, CA (US)

(72) Inventors: Toon Wim Jan Verwaest, Munich (DE); Daniel Kenneth Clifford, Baldham (DE)

(73) Assignee: Google Inc., Mountain View, CA (US)

( * ) Notice: Subject to any disclaimer, the term of this patent is extended or adjusted under 35 U.S.C. 154(b) by 38 days.

(21) Appl. No.: 14/024,592

(22) Filed: Sep. 11, 2013

(51) Int. Cl.
*G06F 9/44* (2006.01)
*G06F 9/45* (2006.01)
*G06F 3/0484* (2013.01)
*G06F 11/36* (2006.01)

(52) U.S. Cl.
CPC ............ *G06F 8/41* (2013.01); *G06F 3/0484* (2013.01); *G06F 11/3688* (2013.01)

(58) Field of Classification Search
CPC ..... G06F 8/41; G06F 3/0484; G06F 11/3688; G06F 9/44
See application file for complete search history.

(56) References Cited

U.S. PATENT DOCUMENTS

| | | | | |
|---|---|---|---|---|
| 4,445,177 A * | 4/1984 | Bratt | ........................ | G06F 8/41 712/245 |
| 8,244,775 B1* | 8/2012 | Bak et al. | ....................... | 707/802 |
| 8,392,881 B1* | 3/2013 | Lund | ........................ | G06F 8/315 717/116 |
| 8,527,950 B2* | 9/2013 | Berry | ..................... | G06F 9/4448 717/124 |
| 8,904,347 B2* | 12/2014 | Miloushev | ................ | G06F 8/24 717/105 |
| 2006/0026506 A1* | 2/2006 | Kristiansen | ......... | G06F 11/3688 715/243 |
| 2006/0206876 A1* | 9/2006 | Barton | ...................... | G06F 8/41 717/137 |
| 2007/0061625 A1* | 3/2007 | Acosta, Jr. | .......... | G06F 11/3688 714/38.1 |
| 2007/0162259 A1* | 7/2007 | Garrett | .................. | G06F 9/4446 702/186 |
| 2009/0228507 A1* | 9/2009 | Jain et al. | ....................... | 707/102 |
| 2010/0042929 A1* | 2/2010 | Berry et al. | ..................... | 715/738 |
| 2011/0055289 A1* | 3/2011 | Ennis | ............................ | 707/805 |
| 2012/0054603 A1* | 3/2012 | Demant | ................ | G06F 3/0484 715/247 |
| 2012/0173998 A1* | 7/2012 | Chaturvedi et al. | ........... | 715/762 |
| 2013/0263085 A1* | 10/2013 | Bouchereau | .................. | 717/108 |
| 2014/0053074 A1* | 2/2014 | Kim | ...................... | G06F 9/5072 715/738 |
| 2014/0143762 A1* | 5/2014 | Li | ............................ | G06F 8/41 717/139 |

OTHER PUBLICATIONS

R. Bourret et al., "A Generic Load/Extract Utility for Data Transfer Between XML Documents and Relational Databases", [Online], IEEE 2000, pp. 1-10, [Retrieved from Internet on Sep. 16, 2015], <https://www.dvs.tu-darmstadt.de/publications/pdf/xmldbms.pdf>.*

(Continued)

*Primary Examiner* — Thuy Dao
*Assistant Examiner* — Ziaul A Chowdhury
(74) *Attorney, Agent, or Firm* — McDermott Will & Emery LLP

(57) ABSTRACT

A system and method is disclosed for sharing type information between object maps. When an object data structure is modified in a dynamic programming environment to change an initial number of object properties a child object map for the modified object data structure is generated based on a parent object map for the unmodified object data structure, and a descriptor array associated with the base object map is shared with the child object map. The descriptor array is dynamically altered according to the modified object data structure, and access to the descriptor array is limited from the parent object map in accordance with the initial number of object properties of the unmodified object data structure.

20 Claims, 5 Drawing Sheets

(56) References Cited

OTHER PUBLICATIONS

Peter Lyngbaek et al., "An Approach to Object Sharing in Distributed Data base Systems", [Online], 1983, pp. 364-375, [Retrieved from Internet on Sep. 16, 2015], <http://www.vldb.org/conf/1983/P364.PDF>.*

Pieter Van Zyl et al, "Comparing the Performance of Object Databases and ORM Tools", [Online], 2006, pp. 1-11, [Retrieved from Internet on Sep. 16, 2015], <http://researchspace.csir.co.za/dspace/bitstream/10204/984/1/van%20zyl_2006.pdf>.*

G. C. Archer et al., "A new object-oriented finite element analysis program architecture", [Online], 1999, pp. 63-75, [Retrieved from Internet on Sep. 16, 2015], <http://www.lmc.ep.usp.br/pesquisas/BEM/oop/fem003.pdf>.*

* cited by examiner

SHARING PROPERTY DESCRIPTOR INFORMATION BETWEEN OBJECT MAPS

BACKGROUND

Some dynamically-typed languages (e.g., JavaScript) provide computational objects in the form of associative arrays. An associative array is an abstract data structure arranges as a collection of key-value pairs, such that each possible key appears at most once in the collection. Accordingly, property values may be stored and looked up by referencing a key. For example, a lookup may be performed based on a property name to locate a pointer to a memory location of the value. To facilitate a faster determination of the memory location, dynamically-typed languages dynamically generate object maps for computational objects at runtime to describe the memory layout of the objects. Additionally, in a dynamically-typed language, the type of a property value is often not known until runtime, and program code loaded during runtime may invalidate a prior assumption about the type of property value. This makes it difficult for a language implementation to use a "raw" storage format for double values.

SUMMARY

The subject technology provides a system and computer-implemented method for sharing property descriptor information between object maps. According to one aspect, a computer-implemented method may include modifying an object data structure in a dynamic programming environment to change an initial number of object properties provided by the object data structure, generating a child object map for the modified object data structure, the child object map based on a parent object map for the unmodified object data structure, sharing a descriptor array associated with the base object map with the child object map in connection with generating the child object map, altering the descriptor array according to the modified object data structure, and limiting access to the descriptor array from the parent object map in accordance with the initial number of object properties of the unmodified object data structure. Other aspects include corresponding systems, apparatuses, and computer program products for implementation of the computer-implemented method.

In another aspect, a machine-readable medium may include instructions stored thereon that, when executed by a processor, cause a machine to perform a method of tracking property representations in instantiated objects. In this regard, the method may include modifying an object data structure in a dynamic programming environment to add a new object property to an initial number of object properties provided by the object data structure, generating a child object map for the modified object data structure, the child object map based on a parent object map for the unmodified object data structure, sharing a descriptor array associated with the base object map with the child object map in connection with generating the child object map, adding a new property descriptor for the new object property to the descriptor array, and limiting access to the descriptor array from the parent object map in accordance with the initial number of object properties of the unmodified object data structure. Other aspects include corresponding systems, apparatuses, and computer program products for implementation of the machine-readable medium.

In a further aspect, a system may include one or more processors and a memory. The memory may include instructions that, when executed by the one or more processors, cause the one or more processors to facilitate the steps of modifying an object data structure in a dynamic programming environment to change an initial number of object properties provided by the object data structure, generating a child object map for the modified object data structure, the child object map based on a parent object map for the unmodified object data structure, sharing a descriptor array associated with the base object map with the child object map in connection with generating the child object map, altering the descriptor array according to the modified object data structure, and limiting access to the descriptor array from the parent object map in accordance with the initial number of object properties of the unmodified object data structure.

The previously described aspects and other aspects may provide one or more advantages, including, but not limited to, conserving memory space when generating dynamically typed information for object instances. Additionally type and mapping information is provided about properties stored in computational objects so that a runtime environment does not need to dynamically check the type of the property value if the type has already been checked, for example, when loading values from properties. When a new property value (or property object) is stored in a property having a current property type that is incompatible with the new property value the current property type and mapping information for the computational object changes so that the information about the properties of the computational object is always guaranteed to be accurate.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
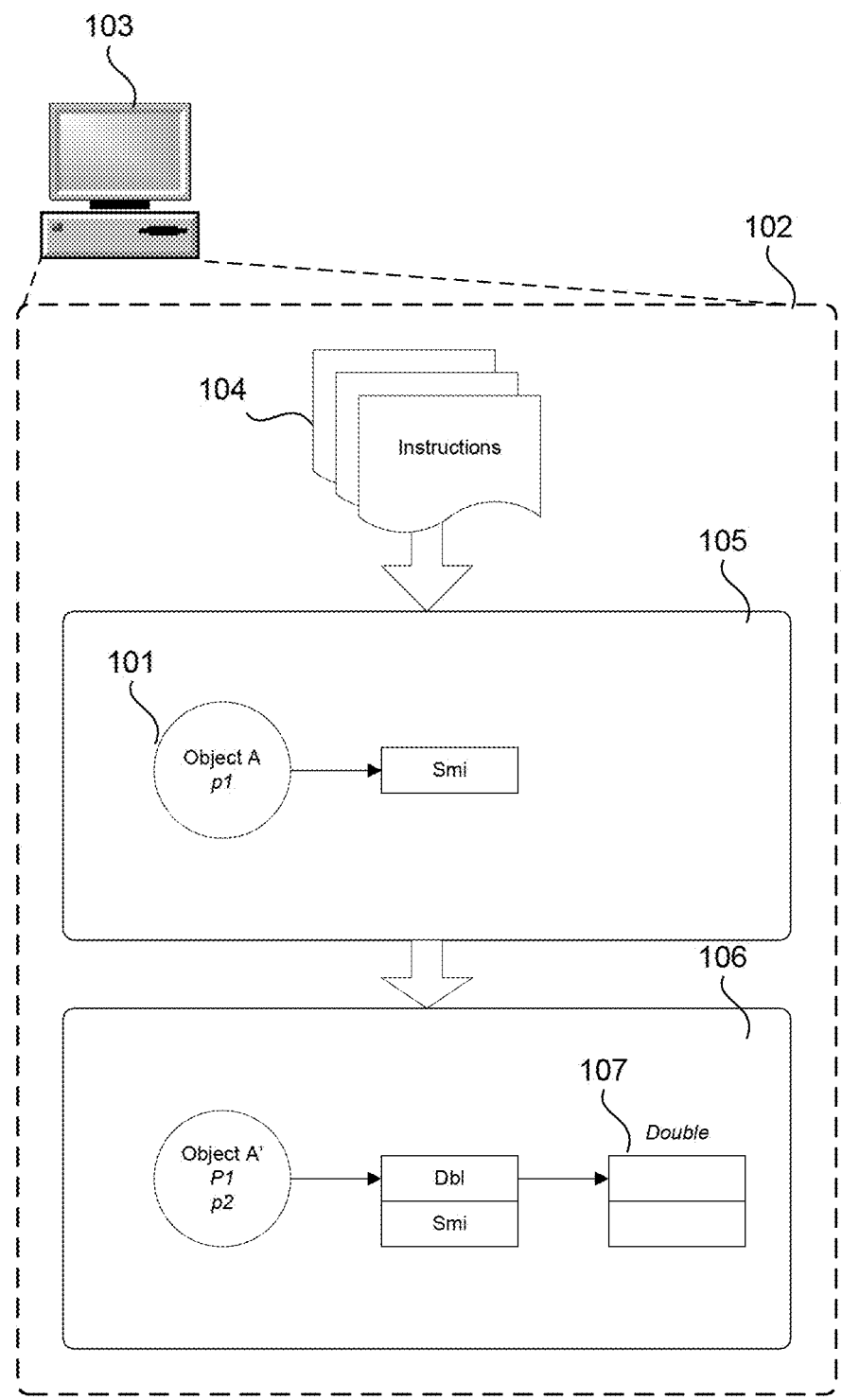
FIG. 1 depicts a modification of an example computational object in a dynamic runtime environment on a computing device.

FIG. 1 depicts a modification of an example computational object 101 in a dynamic runtime environment 102 on a computing device 103, according to one or more aspects of the subject technology. During operation of computing device 103, executable instructions 104 are loaded into runtime environment 102, compiled, and then executed. Instructions 104, when executed, create computational object 101 and may perform a number of operations upon computational object 101. Computational object 101 is a data structure such as an associative array that stores properties having set property values (e.g., a JavaScript dictionary object). Computational object 101 may not have a set number of properties and corresponding values but, rather, the number of properties may be changed by executable instructions 104 in response to predetermined execution paths, user input, or other influences on the runtime environment. For example, executable instructions 104 may be embedded in one or more web pages, and the number of properties and/or their corresponding property values may change in response to specific user-initiated navigation paths and/or input associated with the web pages.

Computational object 101 may store any type of property available to runtime environment 102, and the type of a value stored in a heap property may not be known until runtime. In this regard, computational object 101 may directly store small integers, but store pointers to other property values that must be allocated on the heap. For example, when storing a double value, a small object may be allocated on the heap to hold the value. As used herein, the technique of wrapping primitive values in objects is referred to as "boxing".

In the depicted example, a computational object 101 ("Object A") is dynamically modified to change an initial number of object properties provided by the object. Accordingly, in a first state 105, Object A has one property p1 having a small integer property type ("smi"). p1 may be stored and read by runtime environment 102 directly from the object. During operation of computing device 103, runtime environment 102 (in connection with executable instructions 104) adds a new property and changes the value and type of p1.

Figure 2:
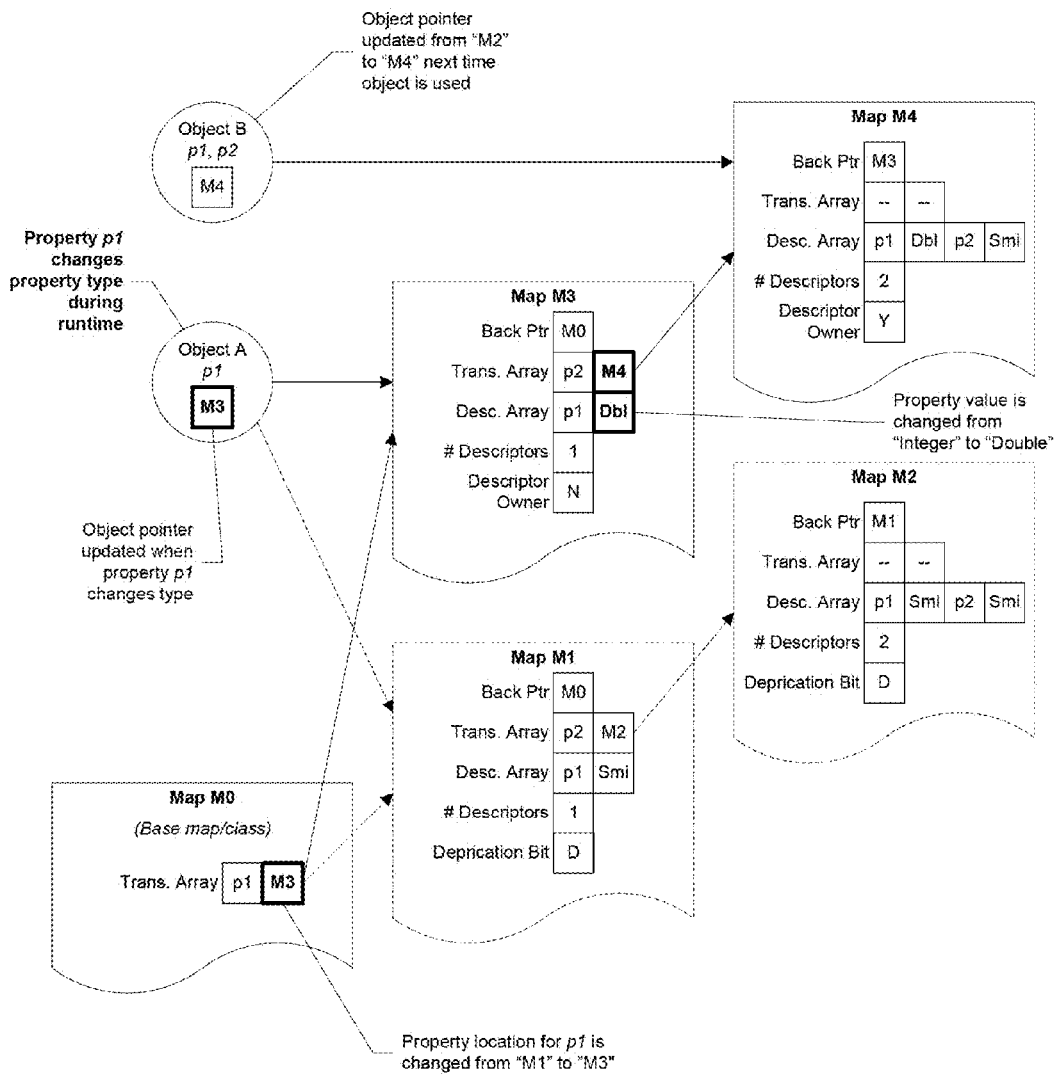
FIG. 2 is a diagram depicting the dynamic generation of an example object map for an example modified computational object.

FIG. 2 is a diagram depicting the dynamic generation of an example object map for an example modified computational object, according to one or more aspects of the subject technology. To facilitate a faster determination of the location in memory for a property value, each computation object of the subject technology has a corresponding object map (also called a "hidden class") that describes its layout. Object maps generally map property names to values (e.g., via memory offsets indicating where the value is stored for an instance of a corresponding object), and in this respect each object in the runtime environment includes an object map corresponding to the specific arrangement of the object. According to the subject technology object maps are dynamically generated to suit the addition or subtraction of different property types at runtime, or deprecated (e.g., designated or marked invalid) to indicate that a property representation is outdated. When no objects are using maps that have been deprecated, the deprecated maps will be garbage collected, saving memory in the runtime environment.

If a property is added to an object, a new map is generated for the object, and transition information is generated in the old map so that the new map and the memory location of the new property may be found when the property is being accessed. Similarly, if a property value stored in an object has a different property type than what is represented by the current or target map for the corresponding property then a new map is generated for the object, and the current or target map is deprecated. In this regard, the new map includes a representation for the property that corresponds to the new property type.

FIG. 2 is representative of how runtime environment 102 creates and deprecates object maps for Object A of FIG. 1 when the property values are updated and/or changed. In the depicted example of FIG. 2, Map M1 is initially created for Object A during the first state 105. M1, like other maps of the subject technology, includes parameters to facilitate determining the location of named properties and their corresponding property representations so that runtime environment 102 may efficiently operate on the object corresponding to the map. For example, each map includes a "transition array" that informs runtime environment 102 where to find properties not located in the current map and a "description array" that determines what properties are stored in the object and, for each property, a corresponding property representation.

The transition array associates the property name with a location of a target (or child) map so that the location of the target map and value of the property name may be determined (e.g., found). As depicted by FIG. 2, a new map is created when a new property is added to an object, and the transition array of the parent or base map updated to include the location of the new map. For example, if a new property p2 is added to Object A, the current map for the object M1 is updated with a transition to target map M2, indicating that if a property p2 is added to an object described by M1 then M2 should be used instead of M1. The transition array may include, for example, the name of the property in the map (e.g., in M1) at a first position in the array, and a pointer to the target map at a second position in the array.

A transition array may include multiple property names, each associated with a different target map. In this respect, a "transition tree" of maps may be generated as objects are modified to delete or add properties, or change property types over time. A parent map may branch to one or more other child maps depending on how new properties were added at runtime. For example, an object having properties p1 and p2 may be in a different branch than an object having properties p1 and p3 (see, e.g., FIG. 3). In one or more implementations, if there is only one transition stored in the transition array then there is no need to store the property name of the transition; only the target map is stored. Since the descriptor array is arranged in order of addition, the property name corresponding to the transition may be determined by indexing the last added descriptor in the target map.

A descriptor array is conceptually an array of property descriptors, with each descriptor comprising a set of values for a corresponding object property. FIG. 2 depicts each descriptor of a map's descriptor array as including a key (e.g., "p1") and a corresponding representation for identifying the property type (e.g., "Db1"). The key may be a property name or other identification for the property. Accordingly, M1's descriptor array informs runtime environment 102 that any object using map M1 has a single property p1 and that p1's representation is "Smi" (small integer). In some implementations, each descriptor array is sorted by the order that the properties were added, and each map stores the number of valid properties for the map. Each property descriptor may also include a memory pointer to its corresponding property value. The memory pointer may be, for example, an offset from a base memory location, so that the memory location of the property value.

The subject technology provides a mechanism for sharing descriptor arrays between maps in the same transition tree. When a new child map is created (e.g., because a new property was added to an existing object), the descriptor array for the parent map may be automatically shared with the child map. A descriptor array may be shared by (1) updating the child map with a pointer to the descriptor array of the parent map, and then appending the new property to the descriptor array; or (2) by copying the descriptor array to the child map, adding the new property to the descriptor array in the child map, and then overwriting the descriptor array in the parent map and other related maps in the same branch of the transition tree with the new property descriptor array. In either case, each map following a property transition is associated with a descriptor array that includes all of the same descriptors as its patent map plus one additional descriptor.

Each map further includes an ownership bit designating whether the map owns its own descriptor array. Only a map having ownership of the descriptor array is allowed to share the array with child maps. The ownership bit, when cleared, prevents a map from re-sharing its descriptor array. Ownership is acquired in connection with the addition of a new property descriptor. For example, if p2 is added to Object A to create Object A' then a new map is Generated for Object A' and the descriptor array for Object A is shared with the new map. The ownership bits for the maps are then set to designate the new map as the owner of the descriptor array. By only allowing maps that own a descriptor array share the array the subject technology avoids redundant copies of the descriptor arrays and extension of maps in more than one direction.

FIG. 2 also depicts how one or more maps in a branch of the transition tree may be deprecated when a property type is changed during runtime. In the depicted example, property p1 of Object A is changed from a small integer to a double. In response, runtime environment 102 determines that the new type is not supported by M1's descriptor array. The runtime environment traverses to M1's base map M0 using a back pointer of M1, and uses M0 to create a new map M3 for Object A. M1 is subsequently deprecated by setting a deprecation bit in the map. As part of this process, the runtime environment may deprecate all maps in the same branch as a deprecated map. For example, M2 may have been created for Object B by adding a small integer property p2 to Object A. M2 may include transition information designating M3 as the location of p2, and M3 may include a back pointer to M2. Accordingly, M3 may be deprecated along with M1 when the property type of p1 is changed in Object A.

Even though M3 has been deprecated some objects may still designate M3 as their map (e.g., hold a pointer to M3). For example, Object B may designate M2, however, M2 may be deprecated. Accordingly, the next time Object B is used, the runtime environment will identify M2 as a deprecated map and associate Object B with an updated map M4 that corresponds to the appropriate property types for p1 and p2.

Figure 3:
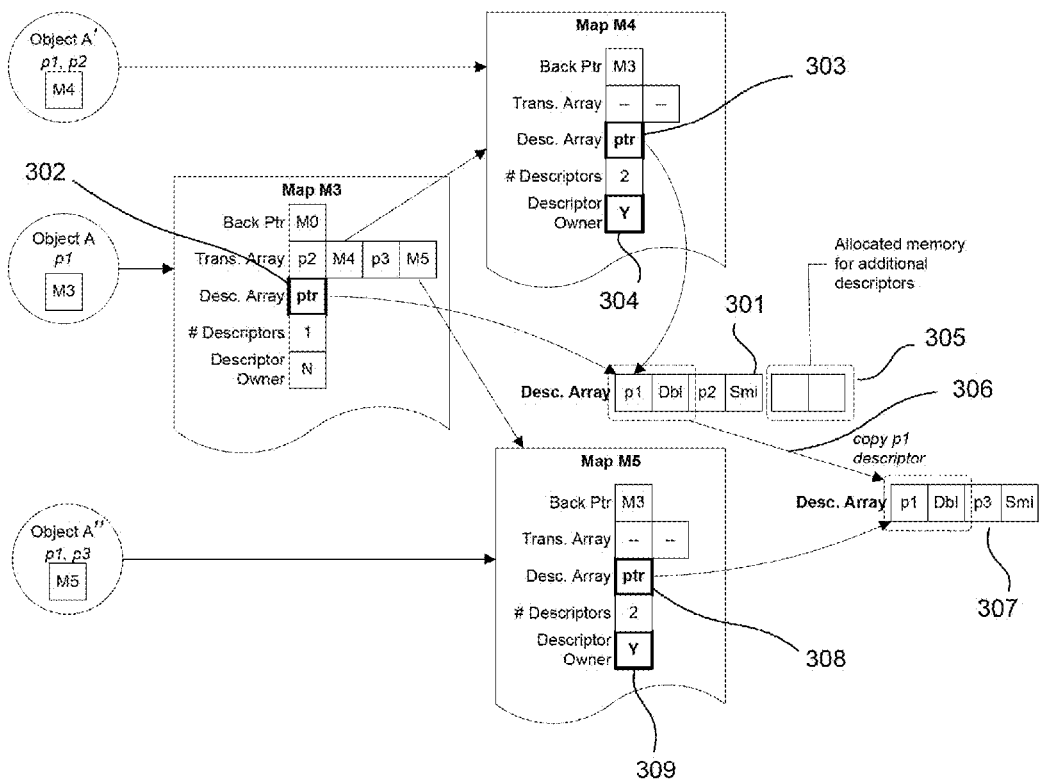
FIG. 3 depicts sharing an example descriptor array for an example parent object map with one or more example child object maps.

FIG. 3 depicts sharing an example descriptor array for an example parent object map with one or more example child object maps, according to one or more aspects of the subject technology. A descriptor array 301 is allocated in an area of memory accessible by one or more maps. In the depicted example, new property p2 is added to Object A to create Object A'. Object A is associated with map M3, which holds a reference or pointer 302 to descriptor array 301. In connection with the addition of the new property, new map M4 is created and descriptor array 301 is shared with M3. Descriptor array 301 is shared by providing M4 with a pointer 303 to the descriptor array, and by designating M4 as the owner of the array by setting an ownership bit 303 of M4.

Maps that transition to each other share descriptors for like properties. Since a child map has the same properties as its parent map, plus one, the child map takes over the property descriptors from the parent map and extends it by a property descriptor for the additional property added to the corresponding object. Instead of copying the descriptor array between maps, the descriptor array may be shared by providing a pointer to each new map and keeping track of a single owner of the descriptor array. In this respect, the amount of memory overhead to store the descriptor array may be limited to the maximum number of properties in a branch a transition tree (e.g., overhead becomes O(n) instead of $O(n^2)$).

Descriptor array 301 may keep track of how much memory space is available for additional descriptors. A new property descriptor (e.g., for property p2) may be added to descriptor array 301 at the end of the array, provided there is enough room or memory to add the descriptor. When descriptor array 301 is full (e.g., no memory space available for the new property), runtime environment 102 may be configured to allocate a predetermined amount of additional memory 305 for the array (e.g., an additional 50% of the currently allocated amount of memory for the array). In various implementations, memory for a new larger array is allocated and the values of the outdated descriptor array 301 copied into the larger array, and all pointers from related maps updated to point to the larger array. The new property descriptor may then be added to the end of the larger array, and the outdated array garbage collected.

In the depicted example, new property p3 is added to a copy of Object A to create Object A". In connection with the addition of the new property, new map M4 is created and descriptor array 301 is shared with M3. Since M3 does not own descriptor array 301, in this example, descriptor array 301 may be shared with M5 by copying a portion 306 of the descriptor array owned by M3 and adding a new property descriptor for new property p3. Accordingly, a new property descriptor array 307 for M5 is generated along with a corresponding descriptor pointer 308 in M5. M5 is then designated as the owner of descriptor array 306 by setting an ownership bit 309 of M5 to avoid further redundant copies of descriptor array 306 along the new branch in the transition tree generated by the transition from M3 to M5 and beyond.

Figure 4:
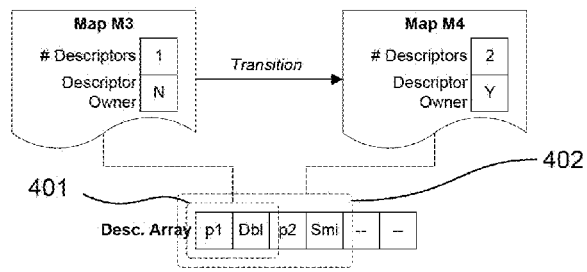
FIG. 4 depicts sharing a subset of descriptors between two object maps.

FIG. 4 depicts sharing a subset of descriptors between two object maps, according to one or more aspects of the subject technology. Whether the descriptor array is shared through copying or by reference, each map may maintain a descriptor limiter designating the number of valid descriptors for the map. In the depicted example, a descriptor limiter 401 of M3 designates that M3 owns one descriptor in descriptor array 301, and a descriptor limiter 402 of M4 designates that M4 owns two descriptors in the array. Property descriptors are ordered in a descriptor array according to the order their corresponding properties are added. Accordingly, the descriptor limiter of each map associated with a descriptor array may designate the number of descriptors owned by the map from the first descriptor position in the array.

In various aspects, the descriptor array may be implemented as a vector or similar storage object. A search of the descriptor array may be limited by the number of valid descriptors, or inform a search when a descriptor is found at a position beyond the number of valid descriptors that the map for the value may be found through one or more map transitions. Additionally or in the alternative, a map may use the number of valid descriptors when determining whether to protect referenced properties and objects from garbage collection. For example, references associated with the descriptor array that correspond to properties of an object instance may be designated as protected from garbage collection, while references associated with the descriptor array that do not correspond to an object instance are not protected. Accordingly, references corresponding to descriptors not owned by a current map may be declared to be weak references, allowing them to be marked for garbage collection when they are no longer associated with an instance of an object.

Whenever a target map becomes outdated because it is not reachable anymore by any other map or object instance, the target map may be garbage collected. If a descriptor array is currently shared with an outdated map then the properties associated with the map should not be kept alive. Accordingly, when a target map becomes outdated, the map is cleared from transition arrays in associated maps, and the now-invalid descriptors for the outdated map are removed from the descriptor array by trimming the array in-place in memory.

Figure 5:
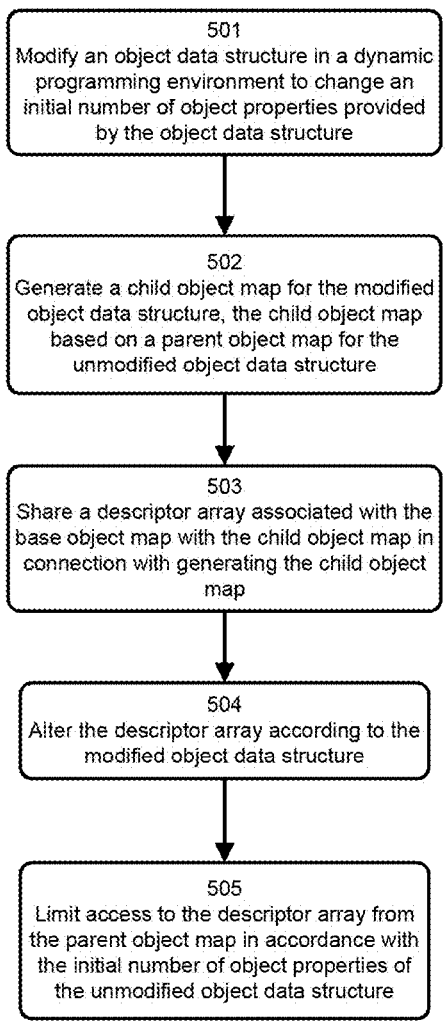
FIG. 5 is a flowchart for an example process of sharing property descriptor information.

FIG. 5 is a flowchart for an example process of sharing property descriptor information, according to one or more aspects of the subject technology. The blocks of FIG. 5 do not need to be performed in the order shown. It is understood that the depicted order is an illustration of one or more example approaches, and are not meant to be limited to the specific order or hierarchy presented. The blocks may be rearranged, and/or two or more of the blocks may be performed simultaneously.

According to one or more implementations, one or more blocks of FIG. 5 may be executed by a machine or computing device. Similarly, a non-transitory machine-readable medium may include machine-executable instructions thereon that, when executed by a machine or computing device perform the blocks of FIG. 5. Accordingly, the blocks of FIG. 5 may be performed in association with dynamically-typed languages, specifically in a dynamic programming environment in which a computational object is modified at runtime.

In block 501, an object data structure is modified in a dynamic programming environment to change an initial number of object properties provided by the object data structure. In various example, the object data structure is modified by adding a new object property. However, it is understood that the object data structure may be modified under different circumstances. For example, a current object property may be deleted or its type information changed.

In block 502, a child object map is generated for the modified object data structure, the child object map based on a parent object map for the unmodified object data structure. Each object in the dynamic programming environment maps properties stored in the object to locations (or offsets) in memory for corresponding values, and includes strong type information for those values. When an object property is added to the object, the object morphs into a new object having a new map. The new map for the child object may include all reference information (e.g., offset values) for the properties referenced by the parent map, and new reference information for properties added to create the child object.

As described previously with respect to FIGS. 2 and 3, maps are dynamically created in a tree formation, with each branch corresponding to objects having a different object property. Each map has transition information that allows the map to determine in what other map includes location and type information for a property. A property is located in a tree of maps by transitioning to each map and checking the map's property representations in the map's descriptor array. Maps are dynamically traversed using transition information in their transition arrays until the desired representation is identified. Accordingly, when a new map is created this transition information is updated to replace a map that includes invalid or stale information with a new map that includes recent information for the new arrangement of object properties.

In block 503, a descriptor array associated with the base object map is shared with the child object map in connection with generating the child object map. As described previously, each map includes a descriptor array for storing the reference information corresponding to object instances of the map. The descriptor array may further store type information about each property value. For example, the descriptor array may include a representation of the property's property type (e.g., "double" or "integer").

The descriptor array may be shared by copying the array or by providing a pointer to the array to the child map. For example, sharing the descriptor array may include copying the descriptor array from the parent object map to the child object map, adding the new property descriptor to the end of the descriptor array in the child object map to create a modified descriptor array, and overwriting the descriptor array in the parent object map (e.g., and maps along the entire parent branch) with the modified descriptor array. Similarly, sharing the descriptor array may include providing a pointer to the descriptor array in the child object map, designating the child object map as the owner of the descriptor array, and designating the parent object map as no longer owning the descriptor array.

In one or more implementations, a second child object map may be generated for a second modified object data structure, the second child object map based on the parent object map. Accordingly, the descriptor array may be copied from the parent object map to the second child object map to generate a second descriptor array for the second child object map, and the second child object map designated as the owner of the second descriptor array. In some aspects, the runtime environment may make a determination that the parent object map owns the descriptor array before sharing the descriptor array.

In block 504, the descriptor array is altered according to the modified object data structure. Accordingly, altering the descriptor array may include adding a new property descriptor for the new object property to the descriptor array. As disclosed previously, the new property descriptor may be appended to an end of the descriptor array, In block 505, access to the descriptor array from the parent object map is limited in accordance with the initial number of object properties of the unmodified object data structure. In one or more implementations, access may be limited by setting a number of descriptors in the descriptor array that can be accessed through the parent object map, with the child object map having access to at least one more descriptor than the parent object map.

In various implementations, property descriptors in the descriptor array are arranged in the order that the properties were added to a corresponding object. The property descriptors are further arranged for efficient searching of the descriptor array for a property. In this respect, each property descriptor may include a key and an array pointer. The key of each property descriptor may be associated with an identifier for an object property, and the array pointer designating a position in the descriptor array of a different key that would otherwise be at the current position if the descriptor array were ordered for a binary search.

In one or more implementations, when a new property descriptor is added to the descriptor array pointers may be inserted into the array, starting at a right position of the array and moving linearly from the end, in the process moving elements that belong later in the array to the right, one by one (e.g., using an insertion-sort). Accordingly, each pointer in the descriptor array designates a position in the descriptor array of a key that would otherwise be at a current position of the pointer within the descriptor array when a binary search is performed on the descriptor array.

The subject technology dynamically organizes a descriptor array so that new properties may be added without reordering the array, while maintaining a structure suitable for binary search. In one or more implementations, each array pointer provides for intra-indexing of the descriptor array, and is paired with a corresponding key to form a key-pointer pair.

The array pointer of each key-pointer pair designates the position in the array of a key that would otherwise be at the current position in the array, had the keys been ordered for a binary search.

For example, a descriptor array $A_D$ may have four property descriptors added to the array sequentially, such that the key-pointer pairs are arranged:

$$A_D = \{[b,3],[c,0],[d,1],[a,2]\} \quad (1)$$

Key c is added after key b, key d after key c, key a after key d, and so on. The array pointer at array position 2 ([d,1]) designates key c (at position 1 in the array) as being in position 2 for a binary search.

Figure 6:
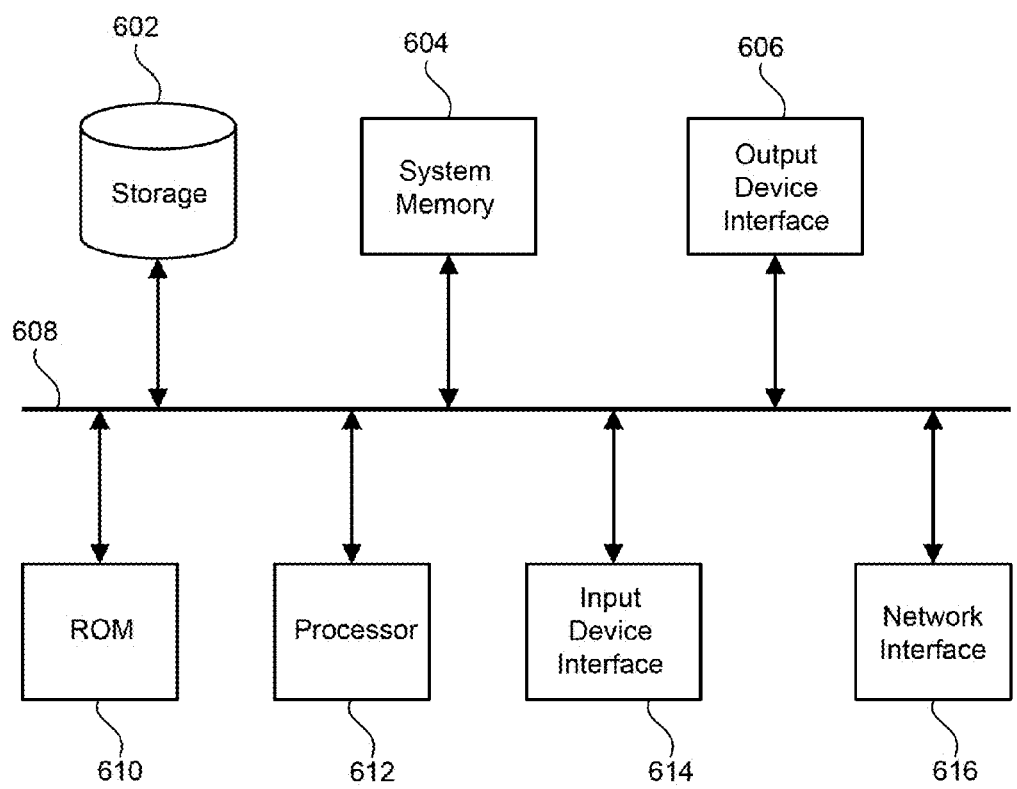
FIG. 6 is a diagram illustrating an example electronic system for use in connection with tracking property representations when an example computational object is modified.

FIG. 6 is a diagram illustrating an example electronic system for use in connection with tracking property representations when an example computational object is modified, according to one or more aspects of the subject technology. Electronic system 600 may be a computing device for execution of software that performs or implements one or more blocks of FIG. 5. In various implementations, electronic system 600 may be representative of a server, computer, phone, PDA, laptop, tablet computer, touch screen or television with one or more processors embedded therein or coupled thereto, or any other sort of electronic device.

Electronic system 600 may include various types of computer readable media and interfaces for various other types of computer readable media. In the depicted example, electronic system 600 includes a bus 608, processing unit(s) 612, a system memory 604, a read-only memory (ROM) 610, a permanent storage device 602, an input device interface 614, an output device interface 606, and a network interface 616. In some implementations, electronic system 600 may include or be integrated with other computing devices or circuitry for operation of the various components and processes previously described.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for sharing property descriptor information, comprising:
    modifying an object data structure in a dynamic programming environment to change an initial number of object properties provided by the object data structure;
    generating, in response to modifying the object data structure, a child object map for the modified object data structure, the child object map being a child map of a parent object map for the unmodified object data structure;
    sharing a descriptor array associated with the parent object map with the child object map in connection with generating the child object map;
    altering the descriptor array according to the modified object data structure; and
    limiting access to the descriptor array from the parent object map in accordance with the initial number of object properties of the unmodified object data structure.

2. The computer-implemented method of claim 1, wherein modifying the object data structure comprises adding a new object property, wherein altering the descriptor array comprises adding a new property descriptor for the new object property to the descriptor array.

3. The computer-implemented method of claim 2, further comprising:
    on adding the new object property, appending the descriptor to an end of the descriptor array, the descriptor comprising a key and a pointer, the key being associated with an identifier for the new object property, and each pointer in the descriptor array designates a position in the descriptor array of a key that would otherwise be at a current position of the pointer within the descriptor array when a binary search is performed on the descriptor array.

4. The computer-implemented method of claim 2, wherein sharing the descriptor array comprises:
    copying the descriptor array from the parent object map to the child object map;
    adding the new property descriptor to the end of the descriptor array in the c object map to create a modified descriptor array; and
    overwriting the descriptor array in the parent object map with the modified descriptor array.

5. The computer-implemented method of claim 2, wherein sharing the descriptor array comprises:
    providing a pointer to the descriptor array in the child object map;
    designating the child object map as the owner of the descriptor array; and
    designating the parent object map as no longer owning the descriptor array.

6. The computer-implemented method of claim 5, further comprising:
    generating a second child object map for a second modified Object data structure, the second child object map based on the parent object map;
    copying the descriptor array from the parent object map to the second child object map to generate a second descriptor array for the second child object map; and
    designating the second child object map as the owner of the second descriptor array.

7. The computer-implemented method of claim 5, further comprising:
    before sharing the descriptor array, determining that the parent object map owns the descriptor array.

8. The computer-implemented method of claim 5, wherein limiting access to the descriptor array comprises setting a number of property descriptors in the descriptor array that can be accessed through the parent object map, the child object map having access to at least one more descriptor than the parent object map.

9. The computer-implemented method of claim 8, further comprising:
    designating, as protected from garbage collection, references associated with the descriptor array that correspond to properties of an object instance while not protecting references associated with the descriptor array that do not correspond to an object instance.

10. The computer-implemented method of claim 5, further comprising:
    before adding the new property descriptor to the descriptor array, determining whether the descriptor array is full;
    adding the new property descriptor array if the descriptor array is not full; and
    if the descriptor array is full, allocating a predetermined amount of additional memory for the descriptor array, and adding the new property descriptor to the descriptor array.

11. A non-transitory machine-readable medium having instructions stored thereon that, when executed, cause a machine to perform a method, the method comprising:
    modifying an object data structure in a dynamic programming environment to add a new object property to an initial number of object properties provided by the object data structure;
    generating, in response to modifying the object data structure, a child object map for the modified object data structure, the child object map being a child map of a parent object map for the unmodified object data structure;
    sharing a descriptor array associated with the parent object map with the child object map in connection with generating the child object map;
    adding a new property descriptor for the new object property to the descriptor array; and
    limiting access to the descriptor array from the parent object map in accordance with the initial number of object properties of the unmodified object data structure.

12. The non-transitory machine-readable medium of claim 11, wherein the new property descriptor is appended to an end of the descriptor array, the new property descriptor comprising a key and a pointer, the key being associated with an identifier for the new object property, wherein each pointer in the descriptor array designates a position in the descriptor array of a key that would otherwise be at a current position of the pointer within the descriptor array when a binary search is performed on the descriptor array.

13. The non-transitory machine-readable medium of claim 11, wherein sharing the descriptor array comprises:
   copying the descriptor array from the parent object map to the child object map;
   adding the new property descriptor to the end of the descriptor array in the child object map to create a modified descriptor array; and
   overwriting the descriptor array in the parent object map with the modified descriptor array.

14. The non-transitory machine-readable medium of claim 11, wherein sharing the descriptor array comprises:
   providing a pointer to the descriptor array in the child object map;
   designating the child object map as the owner of the descriptor array; and
   designating the parent object map as no longer owning the descriptor array.

15. The non-transitory machine-readable medium of claim 14, the method further comprising:
   generating a second child object map for a second modified object data structure, the second child object map based on the parent object map;
   copying the descriptor array from the parent object map to the second child object map to generate a second descriptor array for the second child object map; and
   designating the second child object map as the owner of the second descriptor array.

16. The non-transitory machine-readable medium of claim 14, the method further comprising:
   before sharing the descriptor array, determining that the parent object map owns the descriptor array.

17. The non-transitory machine-readable medium of claim 14, wherein limiting access to the descriptor array comprises setting a number of descriptors in the descriptor array that can be accessed through the parent Object map, the child Object map having access to at least one more descriptor than the parent object map.

18. The non-transitory machine-readable medium of claim 17, the method further comprising:
   designating, as protected from garbage collection, references associated with the descriptor array that correspond to properties of an object instance while not protecting references associated with the descriptor array that do not correspond to an object instance.

19. The non-transitory machine-readable medium of claim 14, the method further comprising:
   before adding the new property descriptor to the descriptor array, determining whether the descriptor array is full;
   adding the new property descriptor array if the descriptor array is not full; and
   if the descriptor array is full, allocating a predetermined amount of additional memory for the descriptor array, and adding the new property descriptor to the descriptor array.

20. A system, comprising:
   one or more processors; and
   a memory including instructions that, when executed by the one or more processors, cause the one or more processors to facilitate the steps of:
   modifying an object data structure in a dynamic programming environment to change an initial number of object properties provided by the object data structure;
   generating, in response to modifying the object data structure, a child object map for the modified object data structure, the child object map being a child map of a parent object map for the unmodified object data structure;
   sharing a descriptor array associated with the parent Object map with e child Object map in connection with generating the child object map;
   altering the descriptor array according to the modified object data structure; and
   limiting access to the descriptor array from the parent object map in accordance with the initial number of object properties of the unmodified object data structure.

* * * * *